P. Rodier.
Sewing Mach. Gauge.
Nº 86594. Patented Feb. 2 1869
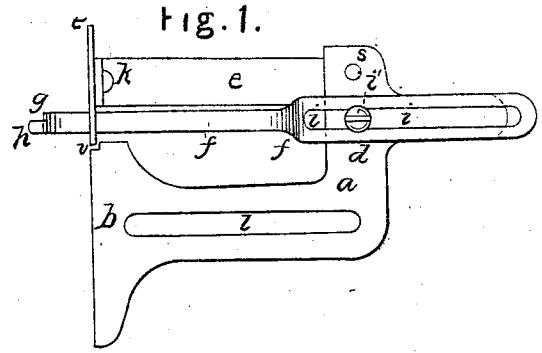
Fig. 1.
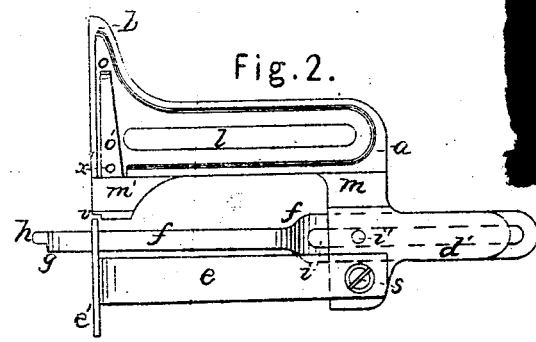
Fig. 2.
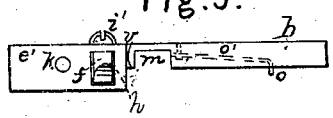
Fig. 3.
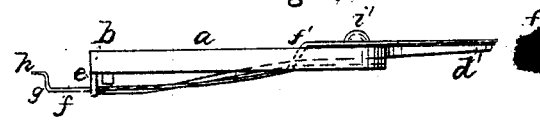
Fig. 4.
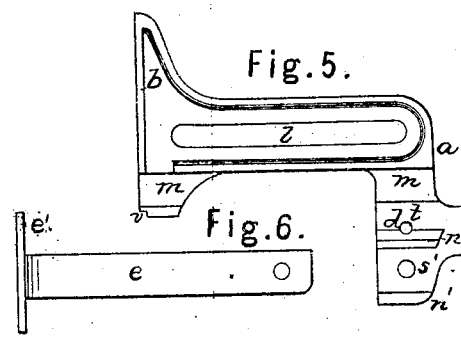
Fig. 5.
Fig. 6.
Fig. 7.
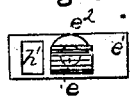
Fig. 8.
Witnesses.
T. A. Curtis
F. E. Rice
Inventor.
Peter Rodier.

PETER RODIER, OF DETROIT, MICHIGAN.

Letters Patent No. 86,594, dated February 2, 1869.

IMPROVEMENT IN GAUGE FOR SEWING-MACHINE.

The Schedule referred to in these Letters Patent and making part of the same.

*To all whom it may concern:*

Be it known that I, PETER RODIER, of Detroit, in the county of Wayne, and State of Michigan, have invented a new and useful Improved Gauge for Sewing-Machines; and I do hereby declare that the following is a full, clear, and exact description thereof, reference being had to the accompanying drawings, making part of this specification, and to the letters of reference marked thereon, in which—

Figure 1 is a plan view of my invention;
Figure 2 is a reverse plan of the same;
Figure 3 is a front view of the same;
Figure 4 is a side view;
Figure 5 is a plan view of the under side of the gauge-plate;
Figure 6 is a bottom view of the swivel-gauge, spring, and plate;
Figure 7 is a side view of the same; and
Figure 8 is an end view of the same.

My invention relates to that class of gauges or guides used for sewing-machines, and consists of a main plate, arranged and constructed in connection with a swivel-gauge and springs, whereby the gauge, considered as a whole, will adapt itself to any inequalities or unevenness of the cloth-plate of a sewing-machine, keeps the cloth more properly in place while being sewed, and it may also, by its peculiar construction, be used in connection with other attachments to a sewing-machine.

In many of the sewing-machines manufactured, there is a protuberance, or slight projection, in the centre of the plate, through which the needle passes in its vertical movements, and known as the "bridge," and even in some machines having no such protuberance, or "bridge," the surface of the plate is more or less uneven, either curved or ridged, so that when the gauge is attached, it does not fit down closely to the top of the plate, or when the gauge is attached in close proximity to the presser-foot, one part or corner of the gauge rests upon the bridge, while the other corner or portion touches the plate only at one point.

This position of the gauge, of course, leaves a space under the gauge, between it and the plate, into which the fold of the cloth is inclined to pass as it is being sewed, unless great care is taken to prevent it, and even with the greatest care, it is almost impossible to prevent such a result, as the attention of the operator is and must be mainly occupied by the operations of the need e.

My invention entirely and perfectly obviates such difficulty, while the spring-attachment, operated by the presser-foot of the machine, keeps the fold of cloth always in its proper position upon the plate, and prevents it from turning up in its passage by and against the gauge.

That others skilled in the art may be able to make and use my invention, I will proceed to describe its construction and mode of operation.

In the drawings—

$a\ b$ represent the main portion of the gauge, $a$ being the rear, and $b$, the front end of the gauge-plate, and having the longitudinal slot $l$ therein, through which to insert the thumb-nut, by which to secure the gauge to the plate of the sewing-machine.

Upon the side of the rear end $a$ is the projection $d$, and upon this is also another projection, $d'$, which merely serves as a bearing for the spring $f$.

Upon the projection or ear $d$ are the two protuberances $n$ and $n'$, the space between these forming a socket for the reception of the end of the spring $e$, which is secured in place in the socket by means of the screw or rivet $s$, passing through a hole in said spring $e$, and also into a hole, $s'$, in the projection $d$.

The other end of the spring $e$ is bent, forming an elbow at $e^3$, and the plate $e^1$ is attached to the vertical portion $e^2$ by means of a screw or rivet, $k$, passing through a hole made in the portion $e^2$ for that purpose, forming a swivel, or movable joint, in such manner that the piece $e^1$ may rotate to a certain extent upon the pivot $k$ in a vertical direction.

This spring $e$ and plate $e^1$ are of such length that, when the spring $e$ is attached to the piece $d$, the front side of the plate $e^1$ shall be upon the same plane with the front of the gauge-plate $b$, and one end of the plate $e^1$ shall reach to the small recess $v$, made in the front of the gauge-plate $b$.

The recess $m$ is made in the gauge-plate $b$, and upon the lower side, and also in the projection $d$, for the purpose of adapting the device to use in connection with a tuck-marker, or other attachment.

The spring $f$ is made wide at one end, and having the longitudinal slot $i$ therein, through which is inserted the screw $i'$, passing into the threaded hole $t$ in the projection $d$, by which to secure said spring $f$ in place upon the gauge-plate, and at $f'$ the said spring $f$ is bent, to permit the narrower part to pass in and out freely through the aperture $h$, made in the swivelled plate $e^1$, in which aperture the said spring operates.

The small end of said spring $f$ is bent upward at $g$, and outward again a short distance above $g$, so that the small end $h$ has about the same horizontal plane or direction as the lower and narrower part.

The small spring $o'$ is attached to the lower side of the gauge-plate $b$ by a rivet, or other suitable means, and the small end $o$ is bent or turned downward at about a right angle to the main portion of the spring, the end $o$ projecting a little below the plane of the lower side of the plate $b$, and the plate-spring $e$ is also bent somewhat, as shown in fig. 7, so that when the said spring is in place upon the gauge-plate $b$, the lower edge of the plate $e^1$ shall be somewhat below the lower edge of the gauge-plate $b$, as shown in fig. 3.

Having thus described the construction of my invention, I will now proceed to describe its mode of operation.

The device being laid upon a sewing-machine plate, the common thumb-nut used is inserted through the slot $l$, and by turning said nut into the plate of the machine tightly, the lower side of the front of the gauge-plate $b$, and the lower side of the plate $e^1$, are both brought down firmly upon the plate of the machine, and if the gauge is placed near to the presser-foot, so that the plate $e^1$ rests upon the "bridge" of the plate, or rests upon any other protuberance upon the table or plate, the elasticity of the spring $e$ keeps the said plate $e^1$ always down against the plate, or "bridge," while said plate $e^1$, being free to turn vertically upon its pivot $k$, adapts itself to any such protuberance or inequality in the plate of the machine. A more perfect joint, or line of contact, is thus formed between the gauge and the plate of the machine, along the lower edge of the face of the gauge, than by any other device now used.

The spring $f$ is particularly useful in hemming, or in similar work, and when used, the small screw $i'$ is loosened, and the gauge $b$ secured in place, and the spring $f$ is then moved through the aperture $h$, towards the presser-foot of the machine, the small end $h$ of said spring $f$ placed upon the presser-foot, and the screw $i'$ is then tightened, and it is ready for use.

In some operations of sewing, it may not be desirable to use the spring $f$, and it can then be withdrawn entirely from the aperture $h'$, or be detached from the gauge.

If it is desired to use the gauge in connection with a tuck-marker, the bar of the tuck-marker passes underneath the gauge-plate $b$ in the recesses $m$ $m$, made for that purpose, and the end $o$, of the small spring $o'$, upon the lower side of the gauge-plate, is brought against the side of the tuck-marker bar, when, if the gauge $b$ is then secured in place, the front of said gauge $b$ will be at a right angle to the said bar.

This device greatly assists the operator in setting both the marker and gauge correctly, which is an operation difficult to perform, even by some experienced operators.

When the spring $f$ is used in hemming, in the operations of the machine, the end $h$, of the spring, which rests upon the presser-foot, is carried up and down by the movements of said presser-foot, so that, when the foot is down, the spring $f$ rests upon the fold or crease of the cloth; and when said foot moves upward, it causes a slight upward movement of the spring, slightly diminishing its pressure upon the cloth, leaving it free to move, although pressing upon the cloth always sufficiently to keep it down in its proper position upon the plate of the machine.

If it is desired to make a very narrow hem, the end $h$ of the spring $f$ may be entirely withdrawn from the aperture $h'$, and the front side of the adjustable plate $e^1$ be placed against or quite near to the presser-foot, when the edge of the hem will pass along against said adjustable plate $e^1$.

In all the different operations of sewing, where this gauge is used, when the cloth under the presser-foot does not project outward beyond the edge of the presser-foot, the spring $f$ is not needed, whereas in all operations where it does so project, the spring $f$ is of very great assistance in keeping the cloth flat upon the cloth-plate of the machine.

In all the operations of sewing, the gauge is used in the same manner as is the common gauge.

It is evident that this device is adapted to all the operations of sewing upon a machine, and either with or without the spring $f$, said spring being brought into use only when desirable.

A small thumb-screw may be substituted for the small screw $i'$, and for a common gauge, in most operations of ordinary sewing, it would be equally operative with the recesses $m$ $m$, and if it should not be desired to use the gauge in connection with a tuck-marker, the small spring $o'$ would not, of course, be required.

The aperture $h$ might also be equally operative if it were made open at the top or bottom, and the spring $e^1$ might be secured to any other part of the gauge-plate $a$ $b$, for the purpose of keeping the automatic adjustable gauge-plate $e^1$ down against the plate of the machine, and still be operative; but I prefer to make the whole device as herein shown, as it is easily adjusted, and well adapted to all operations of sewing, where any gauge is required, and upon any of the common machines now in use.

Having thus described my invention,

What I claim as new, and desire to secure by Letters Patent, is—

1. The gauge-plate $a$ $b$, either with or without the recesses $m$ therein, in combination with the automatic adjustable gauge-plate $e^1$, all constructed and operating substantially as herein described, and for the purposes specified.

2. The gauge-plate $a$ $b$, either with or without the recesses $m$ $m$ therein, in combination with the automatic adjustable gauge-plate $e^1$ and the movable spring $f$, all constructed and operating substantially as herein described and specified.

3. The gauge-plate $a$ $b$, having the recesses $m$ therein, and the spring $o'$ attached thereto, arranged and constructed in connection with the automatic adjustable gauge-plate $e^1$ and the spring $f$, substantially in the manner and for the purposes herein described and specified.

PETER RODIER.

Witnesses:
T. A. CURTIS,
F. E. RICE.